US009550188B2

(12) United States Patent
Holzapfel et al.

(10) Patent No.: US 9,550,188 B2
(45) **Date of Patent: *Jan. 24, 2017**

(54) METHOD OF REDUCING MAGNETIC AND/OR OXIDIC CONTAMINANTS IN LITHIUM METAL OXYGEN COMPOUNDS

(75) Inventors: Michael Holzapfel, Freising (DE); Christian Vogler, Moosburg (DE)

(73) Assignee: Johnson Matthey PLC, London (GB)

( * ) Notice: Subject to any disclaimer, the term of this patent is extended or adjusted under 35 U.S.C. 154(b) by 260 days.

This patent is subject to a terminal disclaimer.

(21) Appl. No.: 13/812,637

(22) PCT Filed: Jul. 4, 2011

(86) PCT No.: PCT/EP2011/061250

§ 371 (c)(1),
(2), (4) Date: Feb. 27, 2013

(87) PCT Pub. No.: WO2012/013454

PCT Pub. Date: Feb. 2, 2012

(65) Prior Publication Data

US 2013/0156683 A1 Jun. 20, 2013

(30) Foreign Application Priority Data

Jul. 26, 2010 (DE) ........................ 10 2010 032 207

(51) Int. Cl.

| | |
|---|---|
| ***B02C 23/08*** | (2006.01) |
| ***C01B 25/37*** | (2006.01) |
| ***C01G 1/02*** | (2006.01) |
| ***C01G 23/00*** | (2006.01) |
| ***C01G 31/00*** | (2006.01) |
| ***C01G 37/00*** | (2006.01) |
| ***C01G 45/12*** | (2006.01) |
| ***C01G 49/00*** | (2006.01) |
| ***C01G 51/00*** | (2006.01) |
| ***C01G 53/00*** | (2006.01) |

(52) U.S. Cl.

CPC ............... *B02C 23/08* (2013.01); *C01B 25/37* (2013.01); *C01G 1/02* (2013.01); *C01G 23/005* (2013.01); *C01G 31/00* (2013.01); *C01G 37/00* (2013.01); *C01G 45/1228* (2013.01); *C01G 45/1235* (2013.01); *C01G 45/1242* (2013.01); *C01G 45/1257* (2013.01); *C01G 49/0027* (2013.01); *C01G 51/42* (2013.01); *C01G 53/42* (2013.01); *C01G 53/50* (2013.01); *C01G 53/54* (2013.01); *C01P 2002/52* (2013.01); *C01P 2002/54* (2013.01); *C01P 2006/80* (2013.01)

(58) Field of Classification Search

CPC ..... B02C 23/08; C01G 49/0027; C01G 53/50; C01G 1/02; C01G 53/54; C01G 53/42; C01G 45/1228; C01G 45/1257; C01G 45/1235; C01G 45/1242; C01G 37/00; C01G 51/42; C01G 23/005; C01G 31/00; C01B 25/37; C01P 2006/80; C01P 2002/54; C01P 2002/52

USPC .................................................... 423/594.15

See application file for complete search history.

(56) References Cited

U.S. PATENT DOCUMENTS

| | | | |
|---|---|---|---|
| 3,685,964 | A | 8/1972 | Treitler et al. |
| 4,973,458 | A | 11/1990 | Newby et al. |
| 5,545,468 | A | 8/1996 | Koshiba et al. |
| 5,910,382 | A | 6/1999 | Goodenough et al. |
| 8,173,049 | B2 | 5/2012 | Ravet et al. |
| 2004/0013941 | A1 | 1/2004 | Kobayashi et al. |
| 2005/0260495 | A1 | 11/2005 | Onnerud et al. |
| 2007/0054187 | A1 | 3/2007 | Nuspl et al. |
| 2008/0285211 | A1 | 11/2008 | Zaghib et al. |
| 2011/0189545 | A1 | 8/2011 | Holzapfel et al. |

FOREIGN PATENT DOCUMENTS

| | | | |
|---|---|---|---|
| DE | 196 53 484 | A1 | 6/1998 |
| DE | 10 2008 026 580 | A1 | 12/2009 |
| DE | 10 2008 064 651 | A1 | 6/2010 |
| EP | 1 049 182 | A2 | 11/2000 |
| EP | 2 322 473 | A1 | 5/2011 |
| FR | 2 814 460 | | 3/2002 |
| JP | 2004-327309 | | 11/2004 |
| JP | 2005-504693 | A | 2/2005 |
| KR | 2008-0101993 | A | 11/2008 |
| TW | 200713669 | | 4/2007 |
| WO | WO 00/15873 | | 3/2000 |
| WO | WO 02/46101 | A2 | 6/2002 |
| WO | WO 2011045049 | A1 * | 4/2011 |

OTHER PUBLICATIONS

Wu et al., *Materials Letters*, 58:1227-1230 (2004).

(Continued)

*Primary Examiner* — Anthony J Zimmer

(74) *Attorney, Agent, or Firm* — Stolmar & Partner; Robert Lelkes

(57) ABSTRACT

A method of reducing magnetic and/or oxidic contaminants in lithium metal oxygen compounds in particle form, in order to obtain purified lithium metal oxygen compounds, by means of treatment in a grinding process and sifting process with continuous or non-continuous removal and obtaining of the purified lithium metal oxygen compound. The grinding process and sifting process are terminated prematurely before the residue amounts to less than 1% of the quantity m. The residue, containing contaminants, is discarded.

14 Claims, No Drawings

(56) References Cited

OTHER PUBLICATIONS

Search Report of Taiwanese Patent Application No. 100125957.
Aono et al., *Ionic Conductivity of the Lithium Titanium Phosphate* ($Li_{1+X}M_XTi_{2-X}(PO_4)_3$, *M=Al, Sc, Y, and La*) *Systems*, J. Electrochem. Soc., 136(2):590-91 (1989).
Aono et al., *Ionic Conductivity of Solid Electrolytes Based on Lithium Titanium Phosphate*, J. Electrochem. Soc., 137(4):1023-27 (1990).
Bruce et al., *Nanomaterials for Rechargeable Lithium Batteries*, Angew. Chem. Int. Ed. 47:2930-2946 (2008).
International Search Report PCT/EP2011/061250 dated Oct. 3, 2011.
Espacenet English language abstract for KR 2008-0101993 A.
English translation of Official communication from the Korean Intellectual Property Office issued in Korean patent application No. 10-2014-7026823, a patent family member of U.S. Appl. No. 13/812,637, on Jun. 9, 2016 citing KR 2008-0101993 A as reference 2 (reference 1 is the JP equivalent of US 2004/0013941 submitted on Oct. 21, 2013).

* cited by examiner

METHOD OF REDUCING MAGNETIC AND/OR OXIDIC CONTAMINANTS IN LITHIUM METAL OXYGEN COMPOUNDS

CROSS-REFERENCE TO RELATED APPLICATIONS

This application is a U.S. National Stage application claiming benefit of International Application No. PCT/EP2011/061250, filed Jul. 4, 2011, and claiming benefit of German Application No. DE 10 2010 032 207.5, filed Jul. 26, 2010. The entire disclosures of both PCT/EP2011/061250 and DE 10 2010 032 207.5 are incorporated herein by reference.

BACKGROUND

The present invention relates to a method of reducing magnetic and/or oxidic contaminants in lithium metal oxygen compounds in particle form in order to obtain purified lithium metal oxygen compounds.

The basic principle of rechargeable lithium-ion batteries (rechargeable accumulators) is a charging and discharging process of electrochemically active ions, whereby a source voltage is generated and the charge equalization is achieved by the migration of lithium ions. Lithium ions migrate from the cathode to the anode during the charging process. This process is reversed during the discharging process and the lithium ions migrate back to the cathode.

Graphite has often been used as anode material in rechargeable lithium-ion batteries. However, this led to the formation of a passivating intermediate layer (SEI=solid electrolyte interface) at the electrolyte boundary surface, this SEI is thermally unstable. Because of this passivating intermediate layer the internal resistance of the lithium-ion battery also increases, whereby extended charging times occur, associated with a reduced power density. In order to avoid these disadvantages attempts were therefore made to provide other anode materials.

Liquid, mostly combustible, electrolyte solutions are customarily used in lithium-ion batteries. These liquid electrolyte solutions represent a safety risk because of their combustibility and lead to increased volume of the lithium-ion batteries. In order to avoid these disadvantages attempts were made to replace these electrolyte solutions with solids by which the safety risk is minimized, and the volume of the lithium-ion batteries is reduced. Further development led to the use of solid lithium compounds as electrolytes which result in a volume reduction of the lithium-ion battery and also guarantee high intrinsic safety. A further advantage is that the solid lithium compounds can no longer dry out, whereby the longevity of the lithium-ion batteries increases.

Ceramic separators are also used as solid electrolytes, such as for example Separion® (DE 196 53 484 A1) now commercially available from Evonik Degussa, which contains ceramic fillers such as small-particle $Al_2O_3$ or $SiO_2$.

Aono et al. investigated the lithium-ion conductivity of various materials. It was shown that doped and non-doped lithium titanium phosphates can be used as solid electrolytes because of their very good lithium-ion conductivity (J. Electrochem. Soc., Vol. 137, No. 4, 1990, pp. 1023-1027, J. Electrochem. Soc., Vol. 136, No. 2, 1989, pp. 590-591).

Systems doped with aluminium, scandium, yttrium and lanthanum in particular were investigated. It was found that doping with aluminium delivers the best results. The highest lithium-ion conductivity was demonstrated as a function of the degree of doping, as aluminium can well occupy the sites of the titanium in the crystal because its cation radius is smaller than that of $Ti^{4+}$. Lithium aluminium titanium phosphates also display a low electric conductivity, which, together with their great hardness (Mohs hardness 8) distinguishes them as very suitable solid electrolytes in secondary lithium-ion batteries.

Lithium metal oxygen compounds are used not only as electrolytes, but also both as anode and as cathode in lithium-ion batteries. As lithium-ion batteries are often used in different ways in electric power tools, computers, mobile telephones etc., and these demand ever more power, the primary objective is to increase the capacity of lithium-ion batteries.

Lithium iron phosphate, used as cathode material, in combination with lithium titanates as anode, leads to a higher current-carrying capacity compared with the use of graphite with lithium titanate as anode material, above all during the charging process, and thus to an increase in the capacity of the lithium-ion battery. In addition to these advantages, these lithium-ion batteries also display high thermal and structural stability, and have a longer life. A further advantage lies in their low toxicity and the associated good environmental compatibility.

Lithium titanate is preferably used instead of graphite as anode material today (U.S. Pat. No. 5,545,468A), alternatively nanocrystalline, amorphous silicon or tin dioxide, lithium-metal compounds, magnesium molybdates or magnesium vanadates. Further anode materials are to be found in Bruce, P. G.; Scrosati, B.; Tarascon, J.-M. *Angew. Chem. Int. Ed.* 2008, 47, 2930-2946.

Lithium titanates crystallize cubically in the spinel structure in the space group Fd3m. Because of the structure and the potential of ca. 1.5 V versus $Li/Li^+$, the formation of a passivating intermediate layer (SEI) on the surface of the lithium titanate spinel electrode is prevented, whereby the aging of the electrode is delayed and the number of charging processes is increased. The improved mechanical and thermal stability also leads to higher intrinsic safety of the lithium-ion batteries, whereby the tendency to short-circuit or overheat is greatly reduced.

Lithium titanates are usually produced by means of solid-state reaction over 3 h to 24 h, starting from titanium dioxide and lithium carbonate or lithium hydroxide, at from 700° C. to 1000° C. in air (U.S. Pat. No. 5,545,468A). Depending on the synthesis temperature, titanium dioxide can however still also be contained in the product in various modifications (rutile, anatase). In addition to solid-state reaction, wet-chemical synthesis of lithium titanates is also possible.

In addition to their use as anode material, lithium metal oxygen compounds are also used as cathode. Papers by Goodenough et al. (U.S. Pat. No. 5,910,382) showed that doped and non-doped lithium transition metal phosphates are particularly suitable for use as cathode material.

Lithium transition metal oxides are also used, such as for example lithium cobalt oxide, lithium nickel oxide, lithium manganese oxide, as well as doped lithium transition metal oxides and lithium transition metal phosphates such as lithium manganese nickel oxide, lithium nickel cobalt oxide or lithium iron phosphate.

Lithium transition metal oxides which have a layered structure are particularly suitable for use as cathode material, as they display a good migration capacity of lithium ions. The transition metal atom preferably has a high affinity to octahedric lattice sites, whereby the tendency towards Jahn-Teller distortion and symmetry reduction falls.

Lithium metal oxygen compounds are prepared by means of solid-state synthesis, sol-gel methods, or hydrothermal synthesis, which delivers the best results. Starting from aqueous lithium hydroxide solutions and metal salts, e.g. in the presence of a base, pure lithium metal oxides, which then still have to be annealed at high temperatures, can be obtained by precipitation of a gel-like deposit.

A precondition for the preparation of the lithium metal oxygen compounds for use in lithium-ion batteries is that their degree of purity is very high. Wet-chemical synthesis routes are preferably chosen for this, since in this way the degree of contamination by non-converted educts can be kept low. However, because of the long drying, annealing and calcining times, large agglomerated particles are obtained (particle sizes from 100 μm to 200 μm) which must be reduced by grinding processes, as only small-particle material in lithium-ion batteries leads to good specific capacity of the lithium-ion battery.

Lithium metal oxygen compounds are mostly characterized by a high hardness, there is therefore marked abrasion of the equipment and devices during grinding processes to reduce the agglomerated particles and further method steps which leads to strong magnetic and/or oxidic contamination in the lithium metal oxygen compounds.

These instances of contamination result in the discharge of the lithium-ion battery, as well as in a reduction in specific capacity. They also represent a serious safety risk, as the magnetic and/or oxidic contaminants can lead to short-circuits, whereby the lithium-ion battery is destroyed, and can even explode under certain circumstances.

In addition to contaminants resulting from magnetic abrasion of equipment, residues of non-converted educts may also be contained in the product, which also have a disruptive effect on the operation of the lithium-ion battery.

The removal of contaminants from lithium metal oxygen compounds is therefore of great importance, both in order to increase the intrinsic safety of the lithium-ion battery and to increase the specific capacity.

Various processes for removing impurities are known from the state of the art.

U.S. Pat. No. 3,685,964 discloses a method in which unwanted iron contaminants from aqueous alkali phosphate solutions are precipitated out by adding sulphides, and isolated. This method cannot be used for lithium metal oxygen compounds, as an agglomeration of the particles occurs due to the annealing and the drying, and the grinding steps that are thereby necessary lead to the appearance of magnetic and/or oxidic contaminants.

U.S. Pat. No. 4,973,458 provides a device and a method with which contaminants can be removed from gases by means of agglomeration of the unwanted contaminants and isolation by ceramic filter systems using a fluidized bed. This method is not suitable for isolating magnetic and/or oxidic contaminants from solid lithium metal oxygen compounds because, although these can be vortexed, there is a danger of their thermally induced decomposition.

The isolation of contaminants in solid phase can also be carried out as a function of the particle size (particle size of contaminant>particle size of product) in a sifting process, or using a cyclone. A purified, small-pore product is obtained, while the larger particles of the contaminants are concentrated in a sifting chamber and discarded after the sifting process.

However, once the particle sizes of the contaminant correspond to the particle size of the product as a result of a grinding process, contaminants can be removed only incompletely, as a result of which a large portion of contaminants still remains in the product.

For ground, small-particle lithium metal oxygen compounds, this method is thus not suitable for achieving the necessary degree of purity, because after the grinding treatment the particle size of the contaminant corresponds to the particle size of the lithium metal oxygen compound, and these cannot be isolated by means of a sifting process according to the method described above, as the separation capacity of a sifter or cyclone is no longer adequate.

Lithium iron phosphates also often contain contaminants consisting of metallic and/or oxidic particles due to metallic abrasion of devices during processing operations, such as grinding, caused by the hardness of the material. These contaminants in the cathode material also lead to high failure rates of the lithium-ion batteries as self-discharge processes are favoured. The removal of contaminants from lithium iron phosphates is therefore very important.

EP 09 013 035.2 describes a method which, starting from uncontaminated lithium iron phosphate, leads to the extensive removal of metallic and/or oxidic particles using a fluid-bed and sifting step. By terminating the grinding process and sifting process prematurely, metallic and/or oxidic contaminants can be isolated from the lithium iron phosphate, as for the most part these stay behind in the sifter, and can be isolated and discarded together with a residue of non-converted lithium iron phosphate.

The state of the art does not contain a method of removing magnetic and/or oxidic contaminants from small-particle lithium metal oxygen compounds.

SUMMARY

The object of the present invention was therefore to provide a method of removing magnetic and/or oxidic contaminants from lithium metal oxygen compounds in particle form in order to obtain purified, small-particle lithium metal oxygen compounds.

This object is achieved according to the invention by a method which comprises the following steps:

a) providing a lithium metal oxygen compound in a quantity m, containing contaminants,
b) introducing a portion of from 5 to 15% of the quantity m of the lithium metal oxygen compound,
c) grinding and sifting the lithium metal oxygen compound with continuous removal and obtaining of the purified lithium metal oxygen compound to a residue of from 3% to 0.01% of the quantity m,
d) removing the purified lithium metal oxygen compound,
e) discarding the residue,
f) repeating steps b) to e) until the whole quantity m has been converted.

It was surprisingly found that magnetic and/or oxidic contaminants in lithium metal oxygen compounds can be isolated by the steps of grinding and sifting with continuous removal and obtaining of the purified lithium metal oxygen compound, and purified, small-particle lithium metal oxygen compounds are thus obtained.

DETAILED DESCRIPTION

By magnetic and/or oxidic contaminants are also meant metallic contaminants within the framework of the present invention. These may be various metallic contaminants which are introduced into the lithium metal oxygen compounds for example by metallic abrasion (for example from various steels) of the equipment used (reaction vessels, weighing devices, grinding, sifting devices, etc.). Furthermore, the contaminants may also be educts remaining from the synthesis reaction. Depending on which synthesis route is chosen, metallic, magnetic and oxidic residues of the educts may also be contained, such as Fe, $Fe_3O_4$, $Li_2O$, $TiO_2$, etc. to name only a few. Residues of metals that are used to dope the lithium metal oxygen compounds according to the invention may also be contained in the lithium metal oxygen compounds.

The grinding process and sifting process is terminated prematurely before the lithium metal oxygen compound used is completely converted, and before the quantity of non-converted lithium metal oxygen compound falls below roughly 1% of the quantity m used. Following premature termination of the grinding process and sifting process, a non-converted residue of roughly 1% of the quantity m used, consisting of contaminants, is discarded.

Surprisingly, the purified lithium metal oxygen compounds obtained by the method according to the invention are so pure and their particles so small that they can be used without further process steps as electrodes for lithium-ion batteries.

Although the particles of the lithium metal oxygen compounds and the contaminants are the same size, they can nevertheless be isolated by the method according to the invention. Without being tied to a specific theory, these can be isolated on the basis of their different density. Compared with the lithium metal oxygen compounds, the magnetic and/or oxidic contaminants have a higher mass, whereby they remain longer in the grinding and sifting chamber and can thus be isolated by the premature termination of the grinding process.

There is thus obtained by the method according to the invention a purified lithium metal oxygen compound in particle form which has a very small proportion of magnetic and/or oxidic contaminants, and at the same time has small particles, which entails an increase in the specific capacity with simultaneous reduction of the volume of the lithium-ion battery, and is therefore particularly well suited for use as anode, cathode or electrolyte material in lithium-ion batteries. Because of the high degree of purity of the lithium metal oxygen compound and the small particle size, the life of the lithium-ion batteries is also increased many times.

By the lithium metal oxygen compounds according to the invention are meant in particular lithium titanates which according to the invention include all lithium titanium spinels of the type $Li_{1+x}Ti_{2-x}O_4$ with ($0 \leq x \leq 1/3$) of space group Fd3m and in general also all doped and non-doped mixed lithium titanates of the generic formula $Li_{1+x}Ti_yO$ ($0 \leq x$, $y<1$).

By lithium metal oxygen compounds are meant here compounds which, in addition to lithium and oxygen, also contain at least one further main- or sub-group metal. This term thus also includes compounds such as phosphates with the generic formula $LiMPO_4$, vanadates with the generic formula $LiMVO_4$, corresponding plumbates, molybdates and niobates. In addition, "classic oxides", such as mixed lithium transition metal oxides of the generic formula $Li_xM_yO$ ($0 \leq x,y \leq 1$), are also meant by this term, wherein M is preferably a so-called "early transition metal" such as Ti, Zr or Sc, but may also, if not as preferably, be a "late transition metal" such as Co, Ni, Mn, Fe, Cr.

Further, by lithium metal oxygen compounds are also meant according to the invention doped and non-doped lithium metal oxygen compounds such as lithium vanadium oxide, lithium chromium oxide, lithium iron oxide, lithium manganese oxide, lithium cobalt oxide, lithium nickel oxide, as well as mixed lithium transition metal oxides, such as lithium cobalt nickel oxide, lithium manganese nickel oxide, lithium chromium manganese oxide, lithium titanium aluminium phosphate, lithium titanium zirconium phosphate.

These compounds are very hard and usually have a Mohs hardness of from 6 to 8. The hardness of the material leads to abrasion of the equipment used for the individual process steps, and thus to contaminations.

By doped and non-doped are meant lithium metal oxygen compounds which display a doping with B, Al, Na, Mg, Ca, Sr, P, Si, Ti, V, Cr, Mn, Fe, Co, Ni, Cu, Zn, Sn, Ga, In, Y, Zr, Nb, Mo, Ru, or W, or mixtures thereof. The specific capacity of the lithium-ion batteries can be increased still further by the doping.

In particular doped lithium metal oxygen compounds can be used in the method according to the invention, wherein the lithium metal oxygen compound has an empirical formula selected from $Li_xMO_2$, $Li_xM_2O_4$, $Li_xM_5O_{12}$, $Li_{1+x}M_{2-x}O_4$, $Li_xM_yO_4$, $Li_xM_2O_4$, $Li_xM_2O_3$, $Li_xM_3O_4$, $Li_{1+x}M_2O_4$, $Li_2MO_3$, $Li_{1-x}M'_yM''_{2-y}O_4$, $Li_xM_2O_3$, $Li_xM_3O_4$, $LiMO_2$, $LiM'_{0.5}M''_{0.5}O_2$, $Li_{1-x}M'_{1.5}M''_{0.5}O_4$, $Li_{1-x}M'_yM''_{1-y}O_2$, or $Li_{1+x}M'_{2-x}M''_x(PO_4)_3$, $LiM'_{0.79}M''_{0.20}M'''_{0.01}O_2$.

According to the empirical formulae named above, the doped lithium metal oxygen compounds can contain at least one metal M', selected from the group B, Al, Na, Mg, Ca, Sr, P, Si, Ti, V, Cr, Mn, Fe, Co, Ni, Cu, Zn, Sn, Ga, In, Y, Zr, Nb, Mo, Ru, or W.

The lithium metal oxygen compounds named above can further contain at least one metal M", selected from the group B, Al, Na, Mg, Ca, Sr, P, Si, Ti, V, Cr, Mn, Fe, Co, Ni, Cu, Zn, Sn, Ga, In, Y, Zr, Nb, Mo, Ru, or W.

The lithium metal oxygen compounds named above can further contain at least one metal M'", selected from the group B, Al, Na, Mg, Ca, Sr, P, Si, Ti, V, Cr, Mn, Fe, Co, Ni, Cu, Zn, Sn, Ga, In, Y, Zr, Nb, Mo, Ru, or W.

Examples of such doped lithium metal oxygen compounds according to the invention, with the doping metal cation of Ti, V, Cr, Mn, Fe, Co, Ni, Cu, Zn, Sn, Al, Zr, Mg, Ca are lithium-titanium oxide compounds such as $Li_xTi_yO$ ($0<x$), ($y<1$); $Li_xTiO_2$ with ($0<x \leq 1$), $Li_xTi_2O_4$ with ($0<x \leq 2$), $Li_xTi_5O_{12}$ with ($0<x \leq 1$), $Li_xTi_2O_4$ with ($0<x \leq 1/3$), $Li_xTi_yO_4$, with ($0.8 \leq x \leq 1.4$) and ($1.6 \leq y \leq 2.2$);

lithium-vanadium oxide compounds such as $Li_xV_2O_4$ with ($0<x \leq 2.5$), $Li_xV_2O_3$ ($0<x \leq 3.5$);

lithium-chromium oxide compounds such as $Li_xCr_2O_3$ with ($0<x \leq 3$), $Li_xCr_3O_4$ with ($0<x \leq 3.8$);

lithium-manganese oxide compounds such as $Li_xMnO_2$ with ($0<x \leq 2$), $Li_xMn_2O_4$ with ($0<x \leq 2$), $Li_{1+x}Mn_2O_4$ with ($0.5<x \leq 1$), $Li_2MnO_3$;

lithium-iron oxide compounds such as $LiFeO_2$, $Li_xFe_2O_3$ with ($0<x \leq 2$), $Li_xFe_3O_4$ with ($0<x \leq 2$);

lithium-cobalt oxide compounds such as $LiCoO_2$;

lithium-nickel oxide compounds such as $LiNiO_2$;

or lithium metal oxide compounds containing mixtures of manganese and nickel: $LiMn_{0.5}Ni_{0.5}O_2$, $Li_{1-x}Ni_{0.5}Mn_{1.5}O_4$ ($0<x \leq 0.5$);

chromium and manganese: $Li_{1-x}Cr_yMn_{2-y}O_4$ ($0<x \leq 1$) and ($0<y \leq 2$);

titanium and aluminium: $Li_{1+x}Ti_{2-x}Al_x(PO_4)_3$ with ($0<x \leq 1$);

titanium and zirconium: $LiTi_{2-x}Zr_x(PO_4)_3$ with ($0<x \leq 1$);

cobalt and nickel: $Li_{1-x}Co_yNi_{1-y}O_2$ with ($0<x \leq 0.6$) and ($0.2<y \leq 1$);

nickel and cobalt, doped with calcium and/or magnesium: $LiNi_{0.79}Co_{0.20}(Ca)_{0.01}O_2$; $LiNi_{0.79}Co_{0.20}(Mg)_{0.01}O_2$.

In a particular embodiment of the present invention the supply of lithium metal oxygen compound to the grinding chamber is terminated after addition of from 3 to 20% of the quantity m, preferably after addition of from 5 to 15% of the quantity m, particularly preferably after addition of 10% of the quantity m.

Within the meaning of the method according to the invention the method according to steps b) to e) is repeated until the whole quantity m has been used and purified.

According to a preferred embodiment of the present method according to the invention, the purified lithium metal oxygen compound is continuously removed and obtained during the grinding and sifting.

The removal and obtaining of the purified lithium metal oxygen compound during the grinding and sifting can also be non-continuous, with the purified lithium metal oxygen compound being removed batchwise.

The lithium metal oxygen compound is preferably subjected to a grinding process and sifting process with removal of the purified lithium metal oxygen compound until the residue amounts to 3% to 0.01% of the quantity m, preferably 2% to 0.5% of the quantity m, preferably 1% of the quantity m. The proportion of residue should be kept as small as possible as it also contains, in addition to magnetic and/or oxidic contaminants, some lithium metal oxygen compound which is discarded with the contaminants and thus leads to losses, but not chosen too small, as too long a grinding and sifting of the material results in an increase in the proportion of unconverted contaminants.

The lithium metal oxygen compound is preferably subjected to a grinding process and sifting process with removal of the purified lithium metal oxygen compound until the residue amounts to 3% to 0.01% of the quantity m, preferably 2% to 0.5% of the quantity m, preferably 1% of the quantity m, containing contaminants, in order that the magnetic and/or oxidic contaminants are contained concentrated in the residue.

According to the invention the grinding process and sifting process are terminated before the residue falls below 3% to 0.01% of the quantity m, before falling below 2% to 0.5% of the quantity m, before falling below 1% of the quantity m. The observance of the given limits leads to the isolation of the magnetic and/or oxidic contaminants from lithium metal oxygen compounds, whereby a small-particle purified material is obtained which can be used directly as electrode material. The degree of purity is less than 1 ppm contaminants, with a particle-size distribution of from 0.9 μm to 7.5 μm. A further post-treatment thus becomes unnecessary thanks to the purification method according to the invention, whereby costs and time can be saved.

Within the framework of the present invention the residue of from 3% to 0.01% of the quantity m, preferably 2% to 0.5% of the quantity m, preferably 1% of the quantity m, is removed and discarded after termination of the grinding process and sifting process, as it contains the magnetic and/or oxidic contaminants in concentrated form.

The particles of the lithium metal oxygen compound can have a carbon-containing coating at least in parts. In further embodiments of the invention the surface of the particles or at least of most of the particles is typically completely covered with a continuous coating of carbon obtained by means of pyrolysis of a carbon-containing material (see e.g. EP 1049182 B1), so-called "pyrocarbon".

Both elemental carbon and pyrocarbon can further be used to coat the typically not yet purified lithium metal oxygen compounds.

By "elemental carbon" is meant here that particles of pure carbon, which can be both amorphous and crystalline, but form discrete particles (in the form of spheres, such as e.g. spheroidal graphite, flakes, grains etc.) can be used. Examples of amorphous carbon are e.g. ketjen black, acetylene black, carbon black etc. However, within the framework of the present invention a crystalline elemental carbon allotrope is quite particularly preferably used. Examples of this are graphite, carbon nanotubes as well as the class of compounds of fullerenes and mixtures thereof. Also, VGCF carbon (vapour grown carbon fibres) is just as preferred as the crystalline allotropes.

The term "pyrocarbon" denotes an uninterrupted, continuous layer of non-crystalline carbon which has no discrete carbon particles. The pyrocarbon is obtained by heating, i.e. pyrolysis of precursor compounds at temperatures of below 1500° C., preferably below 1200° C. and more preferably of below 1000° C. and most preferably of below 800° C. At higher temperatures of in particular >1000° C. an agglomeration of the particles on the mixed lithium metal oxides due to so-called "fusion" often occurs, which typically leads to a poor current-carrying capacity of the composite material according to the invention. Important here is only that no crystalline ordered synthetic graphite forms, the production of which requires temperatures of at least 2800° C. at normal pressure.

Typical precursor compounds are for example carbohydrates such as lactose, sucrose, glucose, polymers such as for example polystyrene butadiene block copolymers, polyethylene, polypropylene, aromatic compounds such as benzene, anthracene, toluene, perylene as well as all other compounds known as suitable per se for the purpose to a person skilled in the art.

The exact temperature also depends on the specific mixed lithium metal oxygen compound to be coated, as e.g. lithium transition metal phosphates often already decompose into phosphides at temperatures around 800° C., whereas "classic" lithium metal oxygen compounds can often even be heated to up to 2000° C. without decomposing.

The carbon-containing coating preferably consists of only one sort of carbon.

According to the invention the steps of grinding and sifting the lithium metal oxygen compound are carried out in a single device suitable for the purpose, for example in a fluidized-bed chamber, as in this way there are no losses during transport between one device and another, and the process can be carried out in time-optimized manner.

The steps of grinding and sifting the lithium metal oxygen compound can equally be carried out in devices separate from each other that are suitable for the process.

In a preferred embodiment the grinding takes place in a fluidized-bed process or a fluid-bed process in a fluidized-bed chamber or in a fluid-bed chamber, in which, using eddying or fluidizing air flows or gas flows which can be introduced into the fluidized-bed chamber via nozzles or by means of distributor systems, particles can be isolated according to their size and density. The lithium metal oxygen compounds can further be ground by means of tube, roll and high-pressure roller mills.

The sifting process can take place using a sifter, fitted with a sifting chamber, a sifting nozzle, by which a sifting stream is produced, as well as a sifting rotor. The method according to the invention can be carried out using various devices, for example pneumatic sifter, cyclone, cyclone sifter or cyclone separator may be named.

In a particular embodiment the method according to the invention can comprise a further grinding step. The further grinding step serves to disagglomerate larger particles which have formed through partial fusion in annealing or calcining steps in order to obtain small-particle lithium metal oxygen compounds which are preferably used in lithium-ion batteries. The reduction of the size of the lithium-ion batteries is very important, therefore the provision of small-particle electrode material is particularly important. The use of small-particle lithium electrode material thus makes possible a higher capacity of the lithium-ion battery, with volume remaining constant.

In a special embodiment the further grinding step takes place in a further device separate from the grinding device and/or sifting device. The further grinding step can be carried out using a jet mill, but any other grinding device, such as for example ball mill, mixer ball mill, planetary mill, centrifugal mill, mortar, Majac counterjet mill, spiral jet mill, oval tube jet mill, fluid-bed counterjet mill, jet mill with baffle plate or Finnpulva counterjet mill, can be used. Agglomerated particles of the lithium metal oxygen compound can be further ground by fine grinding, micronizing (superfine grinding) or cryogen grinding.

In a special embodiment the further grinding step takes place in a device which is fitted with both a fluidized-bed chamber, a sifting chamber and also optionally with a grinding device. Any device in which the method according to the invention can be carried out can be used for this. The AFG 200 fluid-bed counterjet mill of Hosokawa Alpine AG, Augsburg, Germany may be named here by way of example.

According to the invention the grinding and sifting of the lithium metal oxygen compounds can take place with simultaneous cooling, heating and/or drying.

The purified lithium metal oxygen compound contains less than 20 ppm magnetic and/or oxidic contaminants, preferably less than 10 ppm, further preferably less than 5 ppm magnetic and/or oxidic contaminants relative to the total weight of the lithium metal oxygen compound. In a further embodiment the lithium metal oxygen compound obtained according to the invention contains magnetic and/or oxidic contaminants of less than 1 ppm relative to the total weight of the lithium metal oxygen compound.

The purified lithium metal oxygen compound with a small proportion of contaminants that is obtained according to the invention can be used particularly well as active material for electrodes in lithium-ion batteries, as high cycle stability is thereby achieved, capacity is increased and the life of the lithium-ion battery is extended.

The invention is described in more detail below using an example without the latter being taken as limiting:

Method Part:

The methods and equipment used are explained in more detail below.

Grinding and Sifting:

The steps of grinding and sifting a lithium metal oxygen compound were carried out in an AFG 200 fluid-bed counterjet mill of Hosokawa Alpine AG, Augsburg, Germany. The apparatus was used in accordance with the manufacturer's instructions.

Determination of Contaminants:

The contaminants in the lithium metal oxygen compound were determined with a VWR SZT 300 light microscope fitted with a VWR KL 2500 LCD light source. The apparatus was used in accordance with the manufacturer's instructions.

The contaminants in the lithium metal oxygen compound were determined by means of scanning electron microscopy (SEM), using a Zeiss Leo 1530, fitted with a Zeiss secondary electron detector, as well as an Oxford Instruments EDX detector. The apparatus was used in accordance with the manufacturer's instructions.

The contaminants in the lithium metal oxygen compound were determined by means of ICP OES, using a Varian 720 ES ICP Optical Emission Spectrometer and a Perkin Elmer OPTIMA 3300 DV, wherein the apparatuses were used in accordance with the manufacturer's instructions.

EMBODIMENT EXAMPLE 5000 kg (quantity m) of a lithium titanate $Li_4Ti_5O_{12}$, obtainable by the process according to DE 10 2008 026 580.2-41 or U.S. Pat. No. 5,545,468, was treated in a fluid-bed counterjet mill with the present method according to the invention.

The fluid-bed counterjet mill was fitted with wear-resistant, ceramic sifting wheels, air-injection nozzles, as well as outlet valves. The fluidized-bed chamber, as well as the connecting pieces, were provided with a wear-resistant Vulkollan covering.

The grinding parameters were typically defined as follows:

Outlet valve (diameter): 5 mm

Pressure of air flow: 6 bar

Rotation speed of sifting wheels: 4600 rpm

Fill level in the fluidized-bed chamber: 10 to 15 kg

Throughput rate: ca. 60 kg/h 500 kg of the lithium titanate (10% of the quantity m) was introduced into the grinding chamber of the jet mill. The grinding and sifting process was started, and the fill level of the lithium titanate in the fluidized-bed chamber checked several times. The grinding and sifting process was terminated only when the contents of the fluidized-bed chamber had reduced to 5 kg (1% of the quantity m), by continuous removal of the purified lithium titanate by means of the outlet valve.

The fluid-bed counterjet mill was opened and the 5 kg (1% of the quantity m) of the residue removed and discarded in its entirety. Fresh lithium titanate was then added, and the process repeated for the remaining quantity of 4500 kg lithium titanate, using roughly 500 kg (10% of the quantity m) lithium titanate starting material in each case.

To check the degree of purity of the purified lithium titanate in respect of remaining magnetic and/or oxidic contaminants, 500 g of the purified lithium titanate was removed and checked for contaminants by the method described below.

Test Method:

In a cylindrical plastic vessel, capacity 2 l, 500 g of the purified lithium titanate was suspended in 1000 ml distilled water.

A spherical magnet (with a diameter of 12.7 mm (NdFeB N35, with a Ni—Cu—Ni surface, magnetic flux density 11700 to 12100 gauss)) was introduced into this suspension. The spherical magnet was isolated from the suspension, washed with distilled water, as well as cleaned in the ultrasound bath under running water. The magnetic and/or oxidic contaminants adhering to the magnet were concentrated at the poles of the magnet. After drying at 90° C. in the oven, the poles of the magnet were placed on an SEM sample holder which was provided with a conductive, adhering layer. The magnetic contaminants were then examined by means of REM using a BSE detector. It must be borne in mind that quantitative measurements of the contained elements using REM and EDX are not very informative. Because of texture effects of the surface and correspondingly small particle sizes of the particles measured, the electron beam can be deflected, whereby only a semi-quantitative, but qualitatively unambiguous, allocation of the electron-induced, emitted, element-specific X-radiation is possible.

The sample is frequently charged by the primary electron beam during the analysis. If the energy of the primary electron beam is too low, only very few secondary electrons are emitted, which leads to the negative charging of the sample. However, if the energy of the primary electron beam is too high, the sample is positively charged, because of a high number of emitted secondary electrons. Differences in the colouring of the particles arise because of these charging effects. These can be minimized by a thin layer of carbon. This effect can be exploited, as the sometimes strong charging effects during the analysis of the samples thus allow a visual differentiation of the particles. If the energy of the primary electron beam is too low the sample is charged and a clear contrast becomes visible depending on the individual elements. Thus magnetic and metallic elements and compounds, e.g. metallic abrasion of equipment, such as various steels, can be shown as bright white, while oxidic compounds continue to appear grey.

A further sample of the purified lithium titanate was examined for contaminants by means of ICP OES. The solubilized, dissolved sample of the purified lithium titanate was broken down into its atoms by spraying as aerosol in argon plasma at 5500° C. to 8000° C. The plasma excites light emission by the atoms and ions, which, after spectral decomposition of the emitted light, made possible a qualitative and quantitative determination of the elements by means of their wavelengths and intensities.

The sample was examined with a light microscope following the treatment according to the above test method. The magnetic particles adhering to the magnetic sphere allow conclusions to be drawn as to the degree of contamination.

a) unpurified lithium titanate

1. Qualitative Analysis

Normal, unpurified lithium titanate was obtained according to a customary production method and treated according to the test method described above. The qualitative analysis by means of light microscope of the level of magnetic particles adhering to the magnetic sphere showed that the sample contained a relatively high level of more than 1000 ppm contaminants.

The photograph of the magnetic sphere showed that a relatively large number of magnetic contaminants of more than 1000 ppm were contained in the sample which are well visible as adhering magnetic particles.

2. Quantitative Analysis 2.1. SEM

The level of contaminants starting from the normal, unpurified lithium titanate was semi-quantitatively determined by means of SEM. The chosen contrast settings thus allowed a good differentiation between contaminants and lithium titanate. The photographs confirmed a relatively high level of contaminants of more than 1000 ppm. Various elements were detected, such as Fe, Cr, Ni and Zn, together with a little Li and Ti.

2.2. ICP OES

The level of contaminants was further also quantitatively and qualitatively determined by means of ICP OES. The quantitative and qualitative results of the ICP OES analysis showed (Table 1) how many Fe, Cr, Ni, and Zn contaminants were contained in unpurified lithium titanate.

TABLE 1

Results of the ICP OES analysis of unpurified lithium titanate.

| Elements | [ppm] |
|---|---|
| Fe | 13 |
| Cr | 2.8 |
| Ni | 1.5 |
| Zn | 0.13 |

The levels of the different contaminants are summarized in Table 1 and show that unpurified lithium titanate contains predominantly iron as contaminant.

b) poorly purified lithium titanate

1. Qualitative Analysis

Poorly purified lithium titanate was purified by the method according to the invention, but without terminating the grinding and sifting process prematurely. The further treatment took place according to the test method described above. The qualitative analysis by means of light microscope showed that the sample contained a level of magnetic and/or oxidic particles of more than 200 ppm.

The photograph of the magnetic sphere showed a level of more than 200 ppm contaminants in the poorly purified sample.

2. Quantitative Analysis 2.1. SEM

The contaminants in the poorly purified lithium titanate were also semi-quantitatively determined by means of SEM. Photographs with the chosen contrast settings showed that very many contaminants together with a little lithium titanate were contained. The photographs confirmed that, through a complete grinding and sifting of the sample, a high level of contaminants corresponding to that in the starting material remained. Various contaminants such as Fe, Cr, Ni, Zn together with a little Li and Ti were detected.

2.2. ICP OES

The level of contaminants in the poorly purified lithium titanate was also quantitatively determined by means of ICP OES. The quantitative and qualitative results of the ICP OES analysis showed that contaminants such as Fe, Cr, Ni, and Zn were contained in unpurified lithium titanate. Table 2 shows the level of contaminants in the poorly purified lithium titanate.

TABLE 2

Results of the ICP OES analysis of poorly purified lithium titanate.

| Elements | [ppm] |
|---|---|
| Fe | 7 |
| Cr | 1.6 |
| Ni | 0.9 |
| Zn | 0.07 |

The levels of the various contaminants are summarized in Table 2 and show that the present values correspond to the values of the unpurified lithium titanate, as the contaminants remain in the product because the grinding and sifting were not terminated prematurely.

c) well purified lithium titanate

1. Qualitative Analysis

The analysis of well purified lithium titanate, obtained by the method according to the invention, was handled by the test method described above. The qualitative analysis by means of light microscope showed that only small traces of magnetic and/or oxidic particles were contained in the sample.

The photograph of the magnetic sphere showed that less than 20 ppm contaminants were contained in the sample, as particles scarcely adhered to the magnetic sphere.

2. Quantitative Analysis 2.1. SEM

The well purified lithium titanate was semi-quantitatively determined by means of SEM. It was able to be shown with the help of the chosen contrast settings that only a few contaminants of less then 20 ppm were contained in the well purified lithium titanate. The photographs confirmed that the level of contaminants can be reduced by the grinding and sifting according to the invention of the lithium titanate with premature termination of the grinding and sifting process.

Fe, Cr, Ni and Zn together with a lot of Li and Ti were able to be detected.

2.2. ICP OES

The quantitative and qualitative results of the ICP OES analysis showed that Cr, Ni and Fe were still contained as contaminants at the following levels in the well purified lithium titanate (Table 3).

TABLE 3

Results of the ICP OES analysis of well purified lithium titanate.

| Elements | [ppm] |
|---|---|
| Cr | 0.102 |
| Ni | 0.061 |
| Zn | 0.0028 |
| Fe | 0.557 |

The analyses of the purified lithium titanate show that the level of contaminants falls sharply as a result of the method according to the invention (Table 3). The purified lithium titanate displays a very high purity, and only small traces of Cr, Ni, Zn and Fe contaminants.

d) isolated residue

1. Qualitative Analysis

The analysis of the isolated residue, obtained by the method according to the invention, was carried out by means of the test method described above. The qualitative analysis by means of light microscope showed that predominantly magnetic and/or oxidic particles were contained in the sample which were isolated by the method according to the invention.

The photograph of the magnetic sphere showed that very many magnetic contaminants were contained in the sample, more than 10,000 ppm, as a very high level of magnetic contaminants adheres to the magnetic sphere.

2. Quantitative Analysis 2.1. SEM

The contaminants of the isolated residue were semi-quantitatively determined by means of SEM. The chosen contrast settings showed that the sample consisted predominantly of contaminants, more than 10,000 ppm contamination. The photographs confirmed that mainly contaminants are isolated by the premature isolation of the residue, with only small traces of product. Various contaminants such as Fe, Cr, Ni and Zn together with small traces of Li and Ti were detected.

2.2. ICP OES

The quantitative and qualitative results of the ICP OES analysis showed that Cr, Ni, Zn and Fe contaminants were still contained in the purified lithium titanate at the following levels (Table 4).

TABLE 4

Results of the ICP OES analysis of the isolated residue.

| Elements | [ppm] |
|---|---|
| Fe | 1037 |
| Cr | 210 |
| Ni | 98 |
| Zn | 12 |

The analyses of the purified lithium titanate show that the level of contaminants falls sharply as a result of the purification method according to the invention (Table 4). The purified lithium titanate displayed a very high purity, and only small traces of Cr, Ni and Fe contaminants.

The invention claimed is:

1. A method of reducing magnetic and/or oxidic contaminants in doped and non-doped lithium metal oxygen compounds in particle form, comprising the steps of:

a) providing a lithium metal oxygen compound in particle form in a quantity m, said particulate lithium metal oxygen compound containing contaminants;

b) introducing a portion of from 5 to 15% of the quantity m of the lithium metal oxygen compound into a grinding chamber;

c) grinding the lithium metal oxygen compound;

d) sifting the ground lithium metal oxygen compound to obtain a purified lithium metal oxygen compound and a residue of non-converted lithium metal oxygen compound containing the contaminants;

e) removing the purified lithium metal oxygen compound obtained by grinding c) and sifting d);

f) discarding the residue obtained in d); and g) repeating steps b) to e) until the whole quantity m has been converted and the residue amounts to 3% to 0.01% of the quantity m.

2. The method according to claim 1, wherein the particles of the lithium metal oxygen compound in part a) have a carbon-containing coating at least in parts.

3. The method according to claim 1 wherein the lithium metal oxygen compound is doped with B, Al, Mg, Ca, Sr, P, Si, Ti, V, Cr, Mn, Fe, Co, Ni, Zr, Zn, Sn, Nb, Mo, Ru, or W, or mixtures thereof.

4. The method according to claim 3, wherein the lithium metal oxygen compound has an empirical formula with $Li_x$, with 0<x and 0<y selected from $Li_xMO_2$, $Li_xM_2O_4$, $Li_xM_5O_{12}$, $Li_xM_yO_4$, $Li_xM_2O_4$, $Li_xM_2O_3$, $Li_xM_3O_4$, $Li_2MO_3$, $Li_xM_2O_3$, $Li_xM_3O_4$, $LiMO_2$, $LiM'_{0.5}M''_{0.5}O_2$, or wherein the lithium metal oxygen compound has an empirical formula with $Li_{1+x}$ with 0<x and 0<y selected from $Li_{1+x}M_{2-x}O_4$, $Li_{1+x}M_2O_4$, $Li_2MO_3$, $Li_{1+x}M'_{2-x}M''_x(PO_4)_3$, or wherein the lithium metal oxygen compound has an empirical formula $Li_{1-x}$ with 0<x and 0<y selected from $Li_{1-x}M'_yM''_{2-y}O_4$, $Li_{1-x}M'_{1.5}M''_{0.5}O_4$, or $Li_{1-x}M'_yM''_{1-y}O_2$, wherein M is a transition metal, M' is one or more metals selected from the group consisting of B, Al, Na, Mg, Ca, Sr, P, Si, Ti, V, Cr, Mn, Fe, Co, Ni, Cu, Zn, Sn, Ga, In, Y, Zr, Nb, Mo, Ru, and W, M" is one or more metals selected from the group B, Al, Na, Mg, Ca, Sr, P, Si, Ti, V, Cr, Mn, Fe, Co, Ni, Cu, Zn, Sn, Ga, In, Y, Zr, Nb, Mo, Ru, and W, and M''' is one or more metals selected from the group consisting of B, Al, Na, Mg, Ca, Sr, P, Si, Ti, V, Cr, Mn, Fe, Co, Ni, Cu, Zn, Sn, Ga, In Y, Zr, Nb, Mo, Ru, and W.

5. The method according to claim 1, wherein in step b) the introduction of the lithium metal oxygen compound is terminated after introducing a portion of 10% of the quantity m.

6. The method according to claim 1, wherein the purified lithium metal oxygen compound is continuously removed and obtained during the grinding and sifting.

7. The method according to claim 6, wherein the lithium metal oxygen compound is subjected to a grinding process and sifting process until the residue has been reduced to a portion of from 2% to 0.5% of the quantity m.

8. The method according to claim 1, wherein the grinding process and the sifting process are terminated when the residue amounts to 2% to 0.5% of the quantity m.

9. The method according to claim 1, wherein the purified lithium metal oxygen compound obtained by grinding c) and sifting d) is removed until the residue amounts to 1% of the quantity m.

10. The method according to claim 1, wherein the grinding and sifting of the lithium metal oxygen compound is carried out in a single device.

11. The method according to claim 1, wherein the grinding and sifting of the lithium metal oxygen compound is carried out in separate devices.

12. The method according to claim 1, wherein the method according to steps a) to e) also comprises a further grinding step.

13. The method according to claim 12, wherein the further grinding step takes place in a further device separate from the grinding and/or sifting device.

14. The method according to claim 12, wherein the grinding and/or sifting and the further grinding step takes place in a single device.

* * * * *